(12) United States Patent
Kang et al.

(10) Patent No.: US 10,884,578 B2
(45) Date of Patent: Jan. 5, 2021

(54) ELECTRONIC DEVICE AND METHOD FOR CONTROLLING USER INTERFACE OF ELECTRONIC DEVICE

(71) Applicant: Samsung Electronics Co., Ltd., Suwon-si (KR)

(72) Inventors: Dong-Goo Kang, Seoul (KR); Yun-Kyung Kim, Suwon-si (KR); Yeo-Jun Yoon, Seoul (KR); Yong-Yeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/073,224

(22) PCT Filed: Jan. 23, 2017

(86) PCT No.: PCT/KR2017/000781
§ 371 (c)(1),
(2) Date: Jul. 26, 2018

(87) PCT Pub. No.: WO2017/131401
PCT Pub. Date: Aug. 3, 2017

(65) Prior Publication Data
US 2019/0034058 A1 Jan. 31, 2019

(30) Foreign Application Priority Data
Jan. 27, 2016 (KR) .................. 10-2016-0010087

(51) Int. Cl.
*G06F 3/0488* (2013.01)
*G06F 3/0481* (2013.01)
(Continued)

(52) U.S. Cl.
CPC ............ *G06F 3/04817* (2013.01); *G06F 3/01* (2013.01); *G06F 3/0481* (2013.01);
(Continued)

(58) Field of Classification Search
CPC ...... G06F 3/04817; G06F 3/01; G06F 3/0481; G06F 3/0488; G06F 3/0485; G06F 3/04883; G06F 3/0482
See application file for complete search history.

(56) References Cited

U.S. PATENT DOCUMENTS

| 2002/0085034 | A1 | 7/2002 | Cortright |
| 2009/0013275 | A1 | 1/2009 | May et al. |

(Continued)

FOREIGN PATENT DOCUMENTS

| CN | 102053783 A | 5/2011 |
| CN | 103309551 A | 9/2013 |

(Continued)

OTHER PUBLICATIONS

ISA/KR, "International Search Report and Written Opinion of the International Searching Authority," International Application No. PCT/KR2017/000781, dated Apr. 21, 2017, 11 pages.
(Continued)

*Primary Examiner* — Amit Chatly

(57) ABSTRACT

According to various examples, an electronic device can comprise: a display; and a control unit for controlling the display such that the display displays a user interface on which at least one object is arranged according to a sequence of time and displays information on an object selected from among the at least one object arranged on the user interface while displaying the user interface.

15 Claims, 20 Drawing Sheets

(51) Int. Cl.
    *G06F 3/0482*      (2013.01)
    *G06F 3/01*      (2006.01)
    *G06F 3/0485*      (2013.01)

(52) U.S. Cl.
    CPC .......... *G06F 3/0482* (2013.01); *G06F 3/0485* (2013.01); *G06F 3/0488* (2013.01); *G06F 3/04883* (2013.01)

(56) References Cited

U.S. PATENT DOCUMENTS

| | | |
|---|---|---|
| 2009/0049400 A1 | 2/2009 | Ishihara et al. |
| 2009/0327963 A1 | 12/2009 | Mouilleseaux et al. |
| 2009/0327964 A1* | 12/2009 | Mouilleseaux ....... G06F 3/0482 715/834 |
| 2010/0157742 A1 | 6/2010 | Relyea et al. |
| 2011/0096087 A1 | 4/2011 | Chun |
| 2013/0104079 A1* | 4/2013 | Yasui .................... G06F 3/0482 715/834 |
| 2013/0311946 A1 | 11/2013 | Kwon |
| 2013/0317997 A1* | 11/2013 | Sjoblom ................ G06Q 50/01 705/321 |
| 2014/0195979 A1* | 7/2014 | Branton ................ G06F 3/0488 715/834 |
| 2014/0347289 A1 | 11/2014 | Suh et al. |
| 2015/0058769 A1 | 2/2015 | Kim |
| 2015/0205509 A1* | 7/2015 | Scriven ................ G06Q 10/109 715/834 |
| 2016/0299679 A1* | 10/2016 | Park ....................... G06F 1/163 |

FOREIGN PATENT DOCUMENTS

| | | |
|---|---|---|
| CN | 104035696 A | 9/2014 |
| KR | 10-2012-0098254 A | 9/2012 |
| KR | 10-1233955 B1 | 2/2013 |
| WO | 2013-119008 A1 | 8/2013 |

OTHER PUBLICATIONS

European Patent Office, "Supplementary European Search Report," Application No. EP 17744523.6, dated Oct. 10, 2018, 9 pages.

Freeman, Eric, et al., "Lifestreams: Organizing your Electronic Life", AAAI Symposium AI Applications in Knowledge Navigation and Retri, vol. 1995, Nov. 10, 1995, 7 pages.

Notification of the First Office Action in connection with Chinese Application No. 201780008297.8 dated Oct. 27, 2020, 23 pages.

* cited by examiner

| Category | Communication | Location (Environment) | Entertainment (Media Contents) | Health | Schedule |
|---|---|---|---|---|---|
| APPLICATION TYPE | Call, Contact Chat (Kakao, Message) SNS (Facebook, Twitter) | Map Navigation Weather | Music, Video News, Magazine Camera, Gallery | S-health Medicine | Calendar Todo list Reservation (Boarding Pass ETC.) |
| FUNCTION PROVIDED ON PREVIEW SCREEN | DISPLAY SOFT KEY (CALL MENU AND MESSAGE MENU) AND PROVIDE FLICK FUNCTION | PROVIDE PANNING/ ZOOMING FUNCTION BY TOUCH INTERACTION | DISPLAY SOFT KEY (NEXT/PREVIOUS, PLAY/PAUSE) | PROVIDE UP-DOWN SCROLL, LEFT-RIGHT SCROLL, AND PANNING FUNCTIONS | PROVIDE UP-DOWN SCROLL FUNCTION |

FIG.7C

ELECTRONIC DEVICE AND METHOD FOR CONTROLLING USER INTERFACE OF ELECTRONIC DEVICE

CROSS-REFERENCE TO RELATED APPLICATIONS AND CLAIM OF PRIORITY

This application is a 371 National Stage of International Application No. PCT/KR2017/000781, filed Jan. 23, 2017, which claims priority to Korean Patent Application No. KR 10-2016-0010087, filed Jan. 27, 2016, the disclosures of which are herein incorporated by reference in their entirety.

BACKGROUND

1. Field

Various embodiments relate to an electronic device and a method for controlling a user interface of the electronic device.

2. Description of Related Art

A plurality of applications stored in a portable terminal are represented by a plurality of icons corresponding to the plurality of applications through an application view function.

To reduce user's inconvenience of searching for a desired application one by one among the plurality of applications, an icon corresponding to an application frequently used by the user among the plurality of applications is separately displayed on at least one home screen, allowing the user to easily find the desired application.

SUMMARY

However, while the icon corresponding to the user-selected icon is displayed on the at least one home screen and upon selection of the icon, the application corresponding to the selected icon is executed, there is no function to conveniently identify or manage applications previously executed or to be used in the future by the user.

Various embodiments of the present disclosure provide an electronic device and a method for controlling a user interface (UI) thereof in which at least one object previously executed or to be executed may be conveniently identified or managed.

According to various embodiments, an electronic device includes a display and a controller configured to control the display to display a UI on which at least one object is arranged in time order and to display information about an object selected from among the at least one object arranged on the UI while displaying the UI.

According to various embodiments, a method for controlling a UI of an electronic device includes displaying the UI on which at least one object is arranged in time order and displaying information about an object selected from among the at least one object arranged on the UI, while displaying the UI.

With an electronic device and a method for controlling a UI thereof according to various embodiments, a user's use pattern may be provided by conveniently identifying an object used in the past or to be used in the future by a user. Moreover, by providing information about an object used in the past or to be used in the future on a preview screen, the last operation with respect to the object may be conveniently identified. Furthermore, a timeline for simultaneously identifying and managing a history and a schedule in which the past and the future are associated with each other may be provided.

BRIEF DESCRIPTION OF THE DRAWINGS

FIGS. 7A through 7C are views for describing a function provided on a preview screen of an electronic device according to various embodiments.

DETAILED DESCRIPTION

Figure 1:
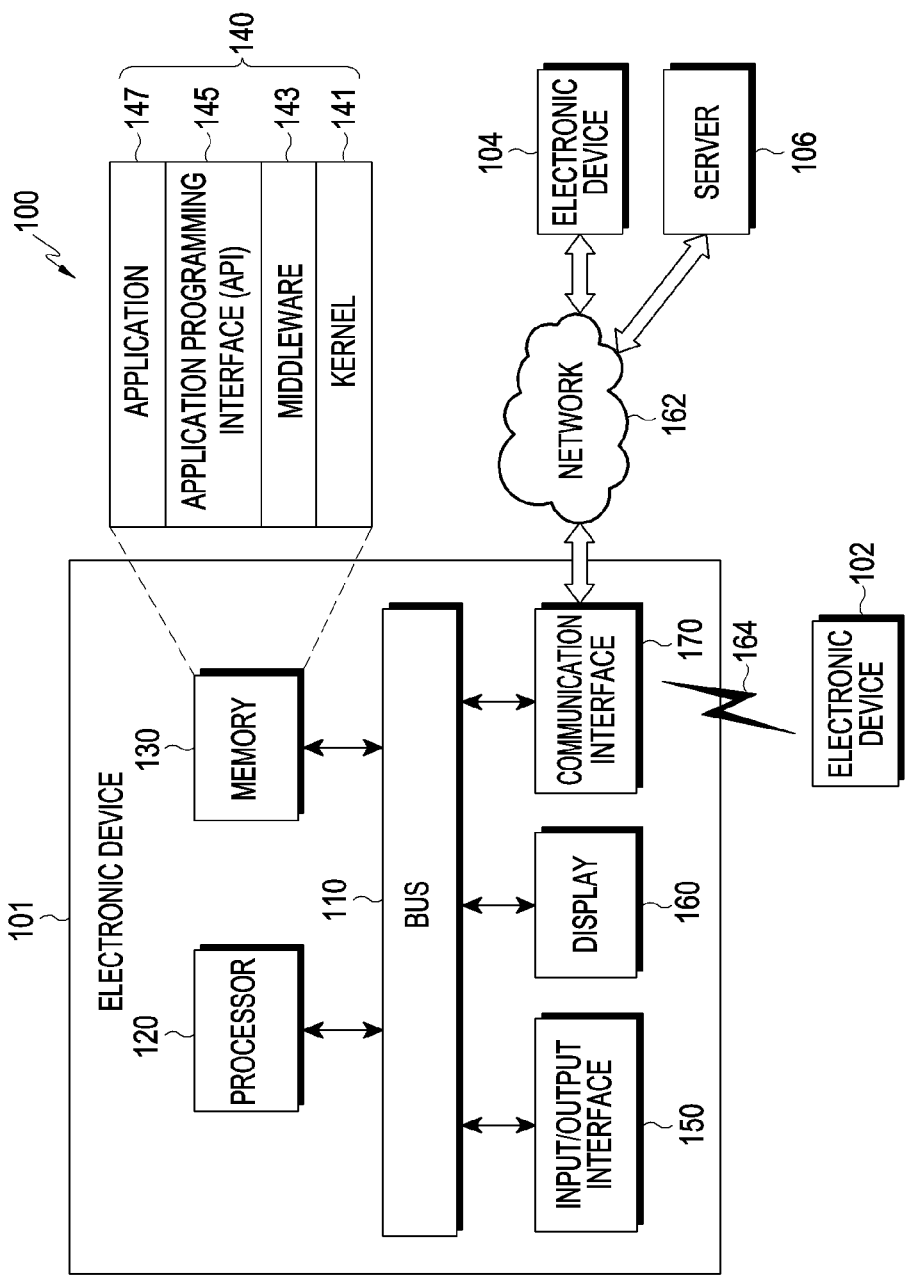
FIG. 1 illustrates a network environment according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101. The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, short-range communication 164. The short-range communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard232 (RS-232), and a plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
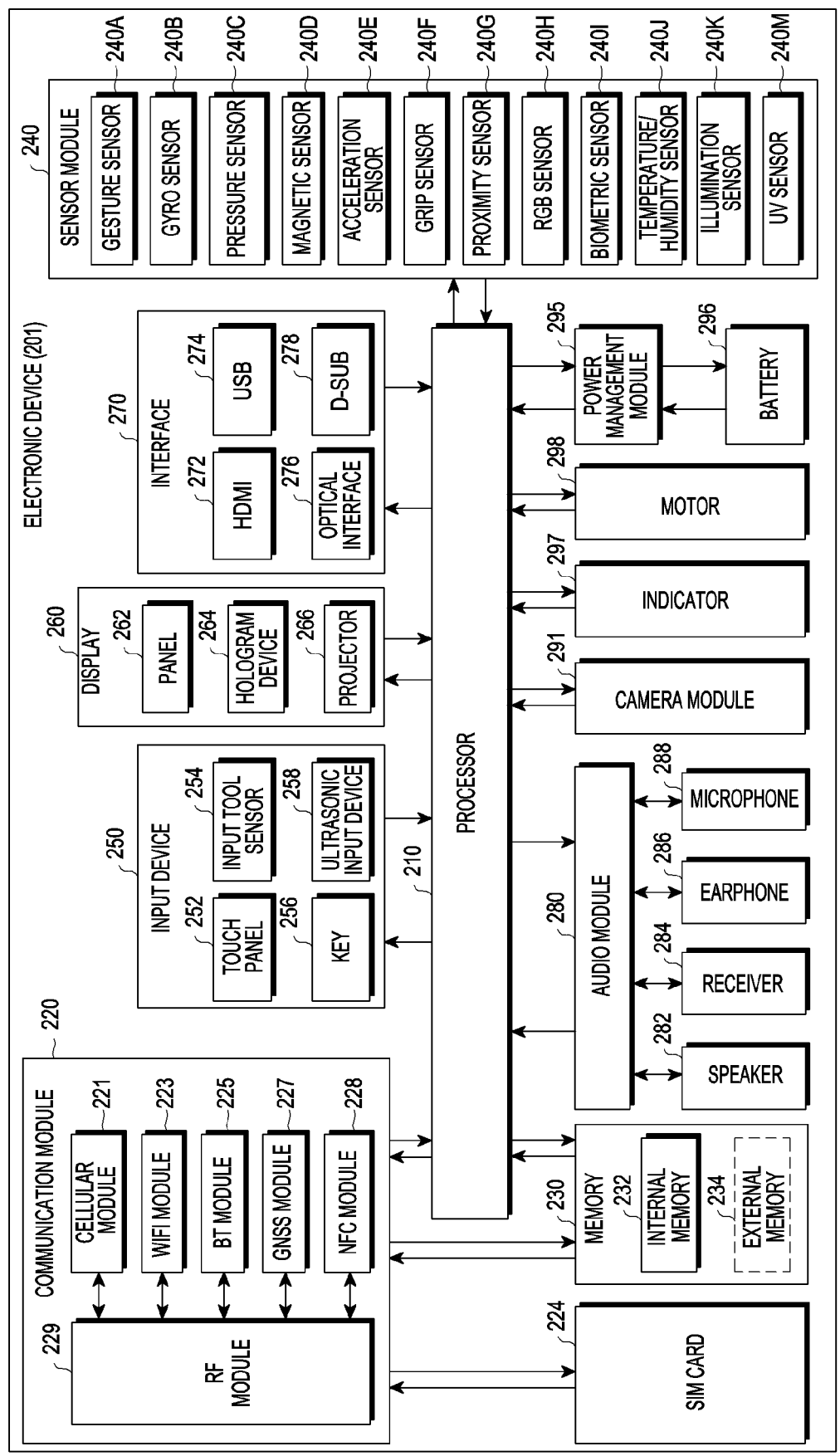
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program and performs processing and operations with respect to various data. The processor 210 may be implemented with, for example, a system on chip (SoC). According to an embodiment of the present disclosure, the processor 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to an embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may include, for example, a card including a SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may include, for example, at least one of a volatile memory (e.g., a dynamic random-access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto a screen through projection of light. The screen may be positioned inside or outside the electronic device 201. According to an embodiment, the display 260 may further include a control circuit for controlling the panel 262, the hologram device 264, or the projector 266.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 bi-directionally converts sound and an electric signal. At least one element of the audio module 280 may be included in the input/output interface 150 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
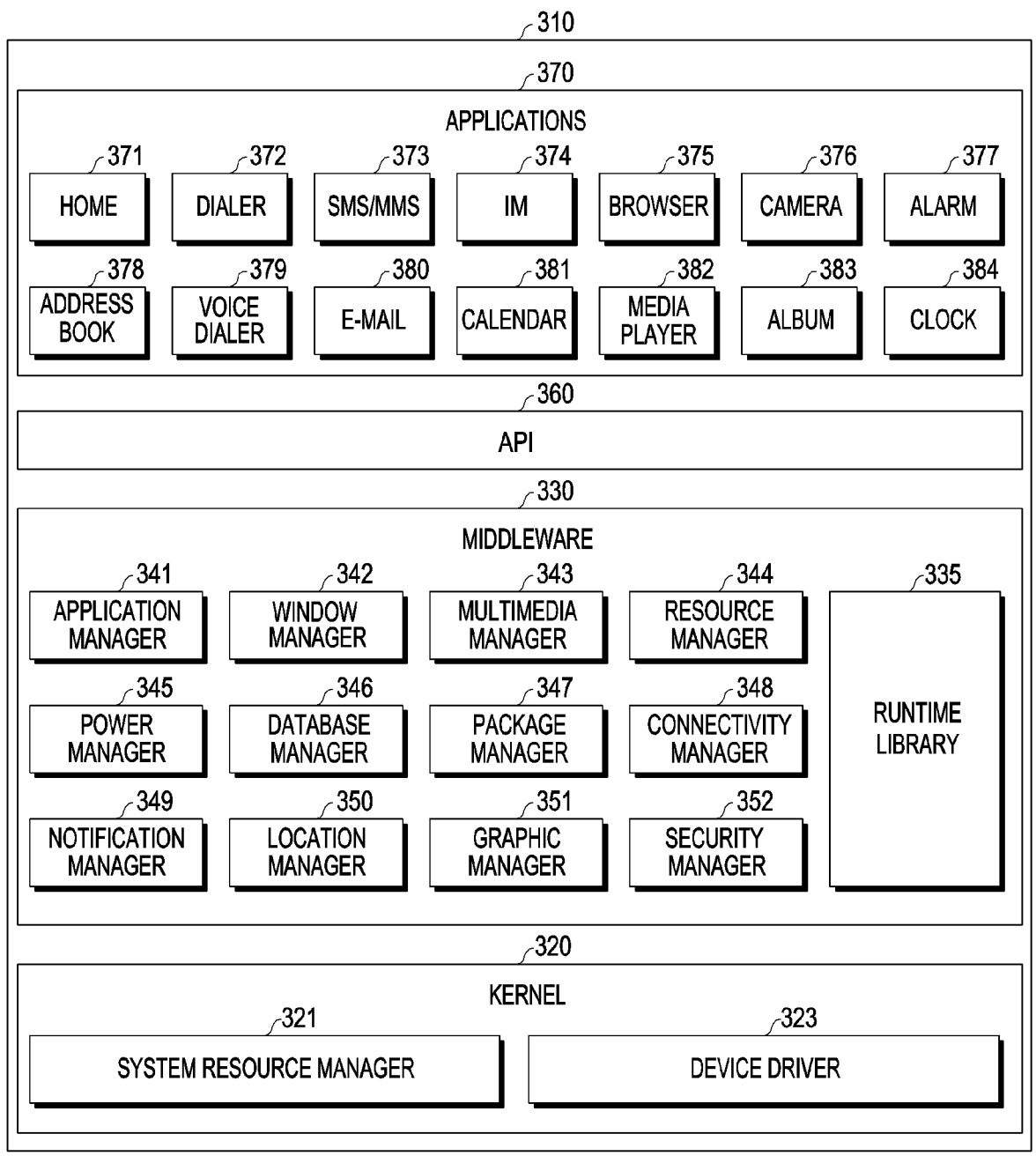
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external device (e.g., the vehicle device 102, the electronic device 104, or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions related to an input/output, memory management, or calculation operation.

The application manager 341 manages a life cycle of at least one of the applications 370. The window manager 342 manages a GUI resource used on a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 37 may include an application (e.g., device health care application of mobile medical equipment) designated according to an attribute of the external electronic device (e.g., the electronic device 102 or 104). According to an embodiment, the application 37 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). At least some of the programming module 310 may include, for example, modules, programs, routines, sets of instructions, or processes for performing one or more functions.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted or may have additional different operations. The embodiments disclosed herein have been provided for description and understanding of disclosed technical matters and are not intended to limit the scope of the present disclosure. Therefore, it should be construed that the scope of the present disclosure includes any change or other various embodiments based on the technical spirit of the present disclosure.

Figure 4:
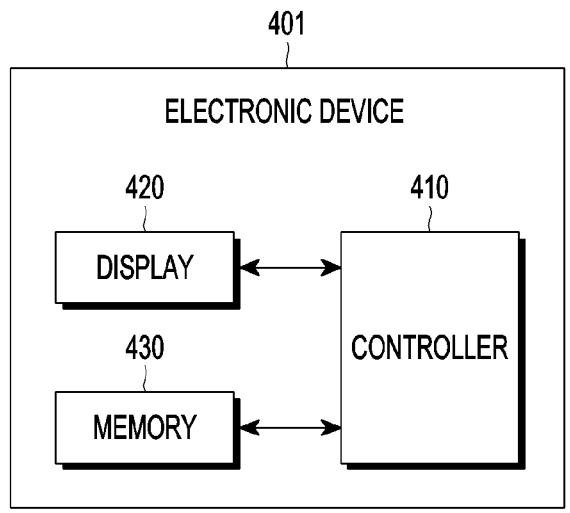
FIG. 4 is a block diagram of an electronic device according to various embodiments.

FIG. 4 is a block diagram of an electronic device according to various embodiments.

Referring to FIG. 4, an electronic device 401 (e.g., the electronic device 101 of FIG. 1) may include a controller 410, a display 420, and a memory 430.

According to various embodiments, the controller 410 displays a user interface (UI) on which at least one objects are arranged in time order on a home screen and displays information about an object that is selected by a user from among the at least one object arranged on the UI while displaying the UI, through a preview screen on the display 420.

According to various embodiments, the object may include at least one of an application, a task, an activity, or an operation performed in the electronic device.

According to an embodiment, the controller 410 may divide the UI into a first region and a second region.

According to an embodiment, the controller 410 may display objects executed in the past and objects to be executed in the future on a block basis in time order on the first region and may display a pointer movable between the at least one object.

The controller 410 displays the executed objects in time order in a first direction on a past-block basis at a first position indicating a present time on the first region and displays the objects to be executed in time order in a second direction opposite to the first direction on a future-block basis at the first position on the first region.

The controller 410 displays the pointer movable on the first region at the first position indicating the present time by default and displays information about an object corresponding to a past block or a future block on a preview screen in a direction in which the pointer moves from the first position.

The controller 410 displays information about an object corresponding to a past block in which the pointer is located as the preview screen when the pointer moves from the first position of the first region in the first direction. When the pointer repeats moving on the first region in the first direction, the controller 410 updates and displays the past block corresponding to the executed object in time order on the first region.

When the pointer moves from the first position in the second direction, the controller 410 displays information about an object corresponding to a future block in which the pointer is located as the preview screen. When the pointer repeats moving on the first region in the second direction, the controller 410 updates and displays the future block corresponding to the executed object in time order on the first region.

When the pointer moves on the first region, the controller 410 displays an indication (e.g., an icon) indicating a type of an object corresponding to a block in which the pointer is located on a partial region of the pointer.

The controller 410 displays blocks displayed on the first region differently (e.g., in different colors) depending on a type or category of an object.

According to an embodiment, the controller 410 displays an indication (e.g., an icon) for providing a basic menu on the first region on the second region. In a first state where the at least one object is arranged in time order on the first region, upon selection of the indication on the second region, the controller 410 switches to a second state where a basic menu (e.g., a call application, a contact application, a message application, an Internet application, and application list view) is displayed on the first region. Upon selection of the indication on the second region in the second state, the controller 410 switches to the first state.

According to an embodiment, the controller 410 detects last screen information or particular screen information stored in association with an object corresponding to a block in which the pointer is located on the first region, reconfigures the last screen information or the particular screen information based on a position or location of the UI displayed on the home screen, and displays the reconfigured screen information as the information about the object. When main information (e.g., a text or content) of the last screen information or the particular screen information is not seen through the UI, the controller 410 reconfigures the last screen information or the particular screen information to allow the main information to be seen. The particular screen information may be stored by being selected by a user at an object termination timing.

According to an embodiment, upon detecting a first gesture when displaying the information about the object selected on the UI, the controller 410 executes the selected object. Upon detecting the first gesture, e.g., a drag to a lower-end bezel region on the second region when displaying the information about the object corresponding to the block where the pointer is located on the first region of the UI, the controller 410 executes the object corresponding to the block where the pointer is located.

According to an embodiment, upon detecting a drag to an upper end from the lower-end bezel region when executing the object through the first gesture, the controller 410 terminates execution of the object and switches to the home screen including the UI.

According to an embodiment, when displaying the information about the object selected on the UI as a preview screen, the controller 410 provides a function related to the selected object on the preview screen. For example, when the pointer is located in the call application by moving on the first region, the controller 410 may display information about the call application as a preview screen and display, as soft keys, a function related to the call application, e.g., a call menu through which a call may be attempted to a user to whom the last call is made and a message menu through which a message may be sent to a user to or from whom the last message is sent or received.

With reference to FIGS. 5 through 9, a description will be made of an operation of controlling an object arranged in time order by using the UI provided on the home screen.

Figure 5A:
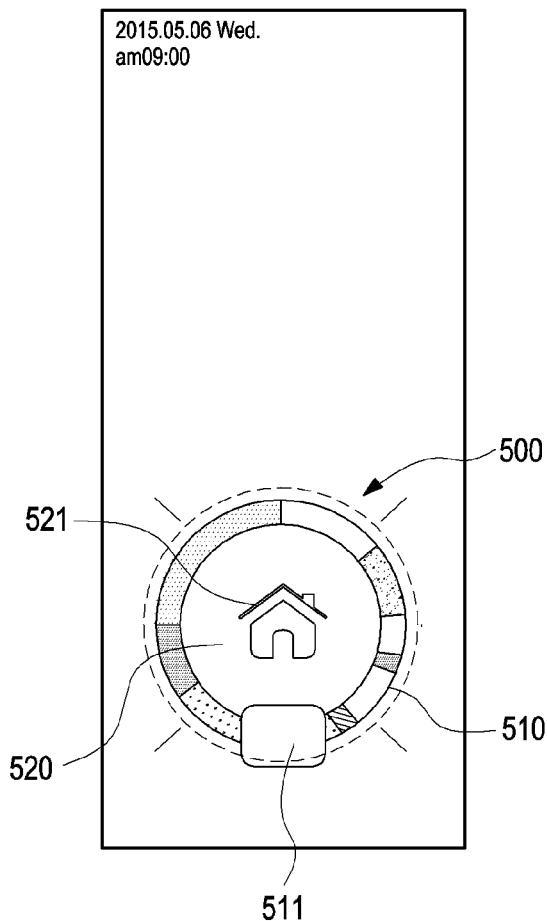
FIGS. 5A through 5C are views for describing a user interface (UI) provided on a home screen of an electronic device according to various embodiments.
Figure 5B:
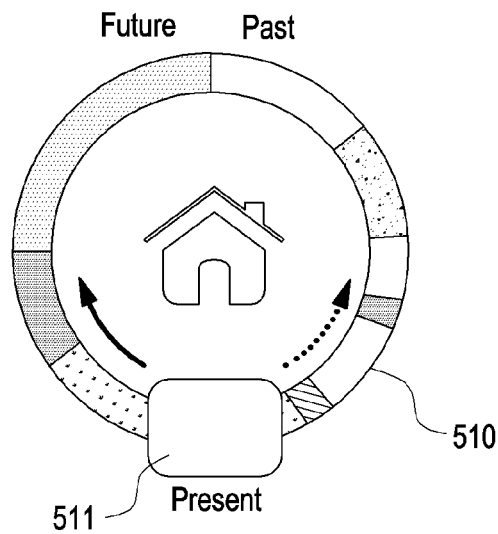
Figure 5C:
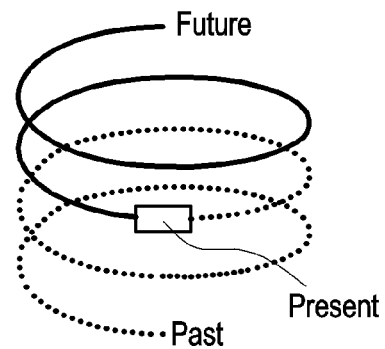

FIGS. 5A through 5C are views for describing a UI provided on a home screen of an electronic device according to various embodiments.

FIG. 5A shows a UI 500 displayed on the home screen. As shown in FIG. 5A, the UI 500 has a shape of a circle including a second region 520 in a circular shape having a specific radius from the center of the circle and a first region 510 in a ring shape surrounding the periphery of the second region 520. The first region 510 includes a pointer 511 movable thereon and located by default at a first position indicating a present time. On the second region 520 is displayed an icon 521 for providing a basic menu on the first region.

FIG. 5B shows a structure of the first region 510 in the ring shape in which the first position where the pointer 511 is located by default indicates a present time. A past block corresponding to an object executed in the past by the user may be arranged in time order in a first direction, e.g., in a counterclockwise direction, with respect to the first position (present). When the first region 510 in the ring shape is rotated by movement of the pointer 511 in the counterclockwise direction with respect to the first position (present), a controller (410 of FIG. 4) updates and displays a past block corresponding to an object executed in the past by the user in time order. A future block corresponding to an object to be executed in the future by the user may be arranged in time order in a second direction, e.g., in a clockwise direction, with respect to the first position (present). When the first region 510 in the ring shape is rotated by movement of the pointer 511 in the clockwise direction with respect to the first position (present), the controller updates and displays a future block corresponding to an object to be executed in the future by the user in time order.

FIG. 5C shows a side structure of the first region 510 of the UI shown in FIG. 5B.

FIGS. 6A through 6E are views for describing a function provided on a UI of an electronic device according to various embodiments. In FIGS. 6A through 6E, at least one application arranged on the UI is described as an example.

Figure 6A:
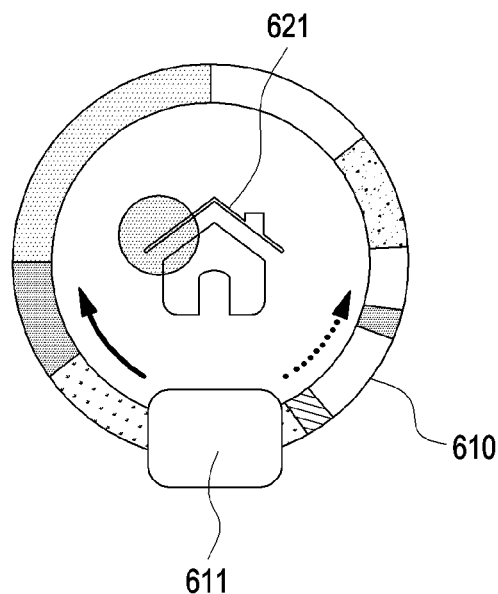
FIGS. 6A through 6E are views for describing a function provided on a UI of an electronic device according to various embodiments.
Figure 6B:
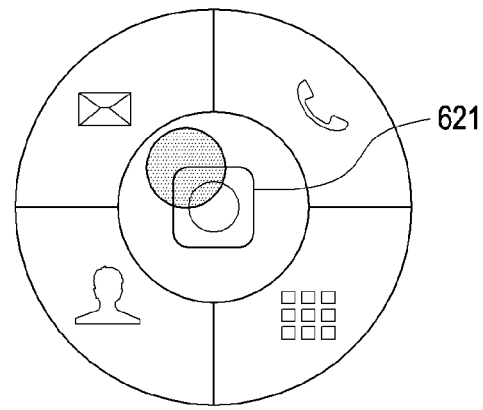

In a first state where blocks corresponding to applications are displayed in time order on a first region 610 (510 of FIG. 5) of a UI 600 (500 of FIG. 5) as shown in FIG. 6A, upon selection of an icon 621 (521 of FIG. 5) of a second region 620 (520 of FIG. 5), a controller (410 of FIG. 4) displays a preset basic menu (e.g., a message application, a call application, a contact application, and application list view) in place of a block corresponding to at least one application arranged in time order on the first region 610 as shown in FIG. 6B. Upon selection of a predetermined menu from among at least one basic menu displayed on the first region 610, the controller executes a function corresponding to the selected menu.

Figure 6C:
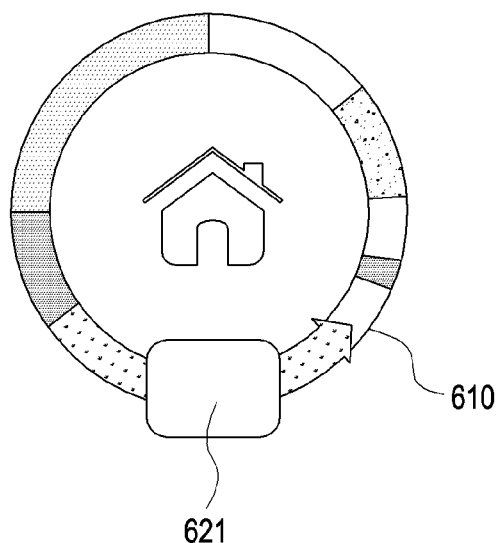

In a second state of the first region 610 as shown in FIG. 6B, upon selection of the icon 621 of the second region 620, the controller switches to the first state where the block corresponding to the at least one application arranged in time order is displayed in place of the basic menu on the first region 610 as shown in FIG. 6C.

Figure 6D:
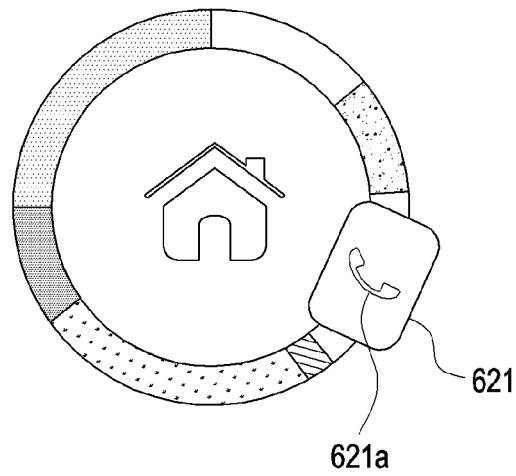

As shown in FIG. 6D, when the pointer 611 is located on the call application executed in the past by moving in the first direction on the first region 610, the controller displays an icon 621*a* in the shape of a phone indicating a type of the call application on a predetermined region of the pointer 611.

Figure 6E:
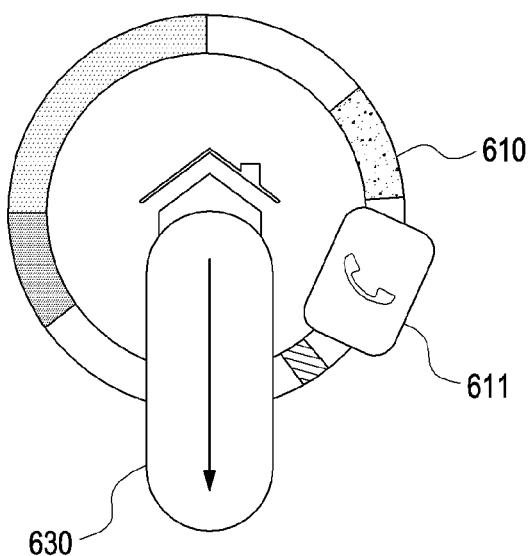

As shown in FIG. 6E, in a state where as the pointer 611 is located on the call application executed in the past by moving in the first direction on the first region 610, the icon 621*a* in the shape of a phone indicating a type of the call application is displayed on the predetermined region of the pointer 611 and information about the call application is displayed as a preview screen on the home screen, upon detection of a first gesture, e.g., a drag 630 to the lower-end bezel region on a second region, the controller executes the call application.

Figure 7A:
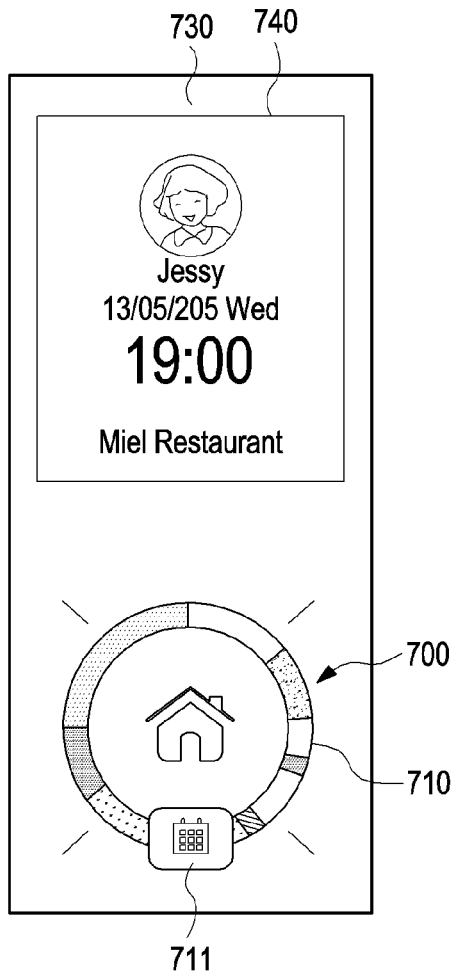
Figure 7B:
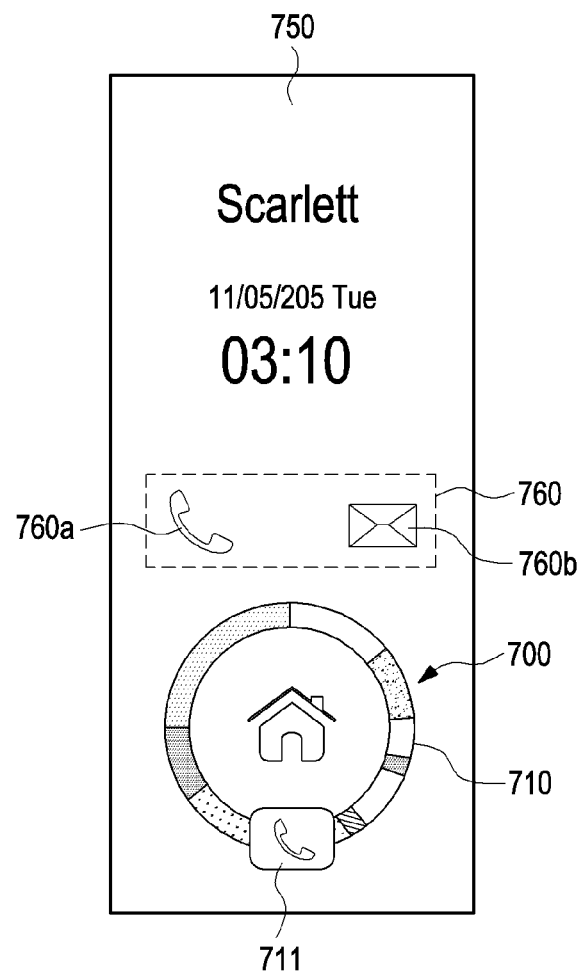

FIGS. 7A through 7C are views for describing a function provided on a preview screen of an electronic device according to various embodiments. In FIGS. 7A through 7C, at least one application arranged on the UI is described as an example.

As shown in FIG. 7A, when a pointer 711 is located on a schedule application on a first region 710 of a UI 700, information about the schedule application is displayed as a preview screen 730 and a function related to the schedule application, e.g., schedule details 740 are displayed on the preview screen 730.

As shown in FIG. 7B, when the pointer 711 is located on the call application on the first region 710 of the UI 700, information about the call application is displayed as the preview screen 750 and a function related to the call application, e.g., a control menu 760 is displayed on the preview screen 750. The control menu 760 may display a call menu 760*a* through which a call may be attempted to the last caller or callee (e.g., "Scarlett") corresponding to the information about the call application and a message menu 760*b* through which a message may be sent to the last message sender/receiver (e.g., "Scarlett") corresponding to the information about the call application as soft keys.

FIG. 7C shows a function related to each application for a category of the application. In FIG. 7C, the function related to the application for the category of the application is an example, and various functions may be selectively set or added.

As shown in FIG. 7C, an application category 780 may include communication 781, location 782, entertainment 783, health 784, and schedule 785.

For the communication category 781 including application types such as call, contact, chat, social network service (SNS), and so forth, when a preview screen for applications related to the communication category 781 is displayed, a call menu for making a call and a message menu for sending a message may be displayed as soft keys and a flick function may be provided on the preview screen.

For the location category 782 including application types such as map, navigation, weather, and so forth, when a preview screen for applications related to the location category 782 is displayed, panning and zooming for touch interaction may be provided on the preview screen. For example, when the last used map is displayed as a preview screen for the map application, other parts of the map not displayed on a display or a particular part of the map may be displayed enlarged by using panning or zooming.

For the entertainment category 783 including application types such as music, video, news, magazine, camera, gallery, and so forth, when a preview screen for an application related to the entertainment category 783 is displayed, soft keys such as next, previous, play, pause, and so forth may be displayed on the preview screen.

For the health category 784 including application types such as health, medicine, and so forth, when a preview screen for applications related to the health category 784 is displayed, up-down/left-right scrolling for searching for a record or a list and panning for searching for content such as a graph may be provided on the preview screen.

For the schedule category 785 including application types such as calendar, to-do list, reservation, and so forth, when a preview screen for applications related to the schedule category 785 is displayed, up-down/left-right scrolling for checking details of a schedule may be provided on the preview screen.

FIGS. 8A through 8E are views for describing a UI control operation in an electronic device according to various embodiments. In FIGS. 8A through 8E, at least one application arranged on the UI is described as an example.

Figure 8A:
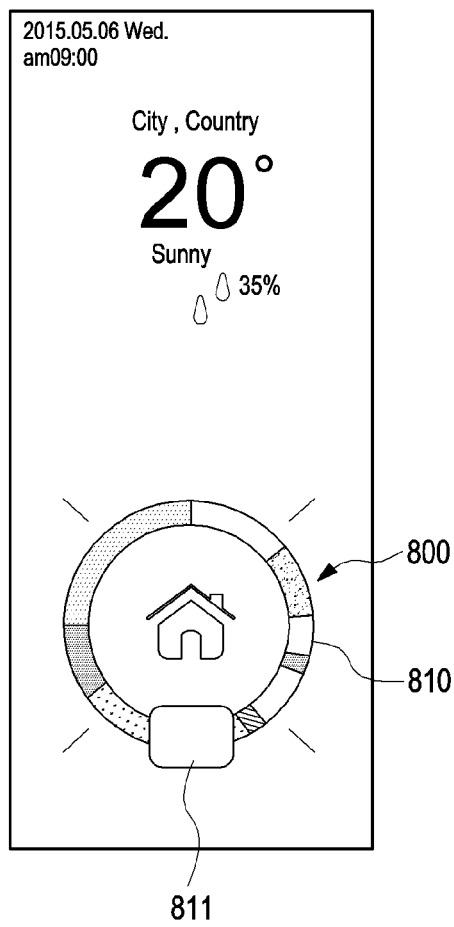
FIGS. 8A through 8E are views for describing a UI control operation in an electronic device according to various embodiments.
Figure 8B:
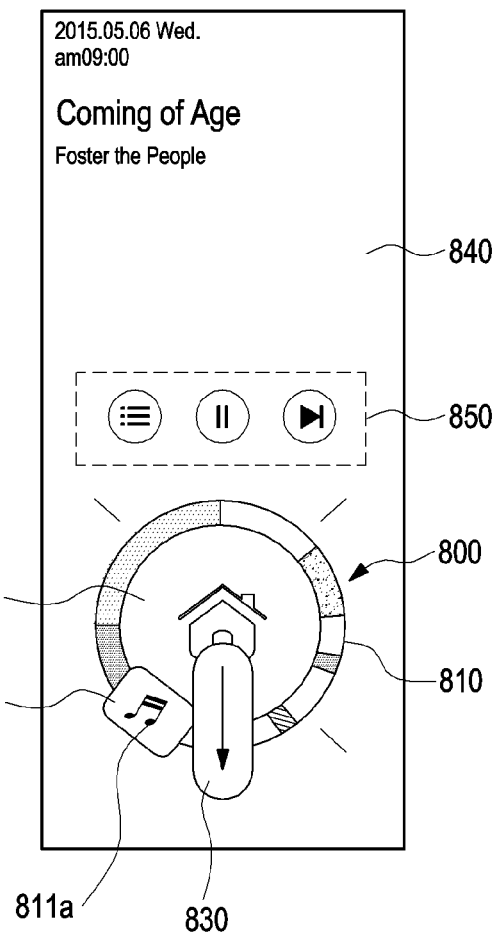

During display of a UI 800 (500 of FIG. 5) on a home screen as shown in FIG. 8A, when a pointer 811 (511 of FIG. 5) is located on a music application executed in the past by rotating in a first direction, e.g., in the counterclockwise direction, a controller (410 of FIG. 4) displays information about the music application as a preview screen 840, an icon 811*a* indicating a type of the music application on the pointer 811, and a function 850 related to the music application on a predetermined region of the preview screen 840, as shown in FIG. 8B.

Figure 8C:
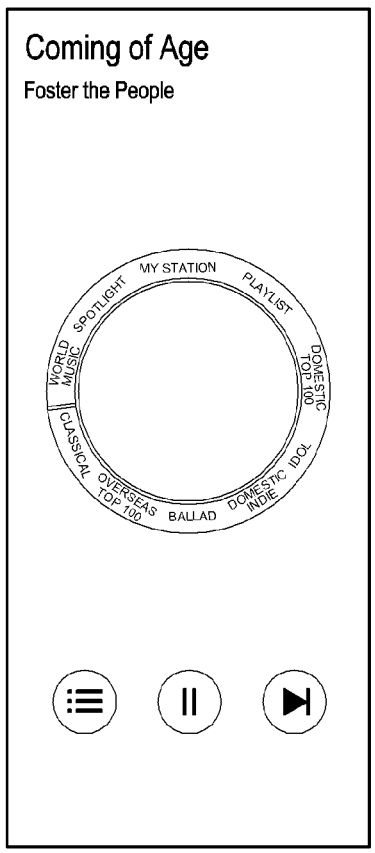

Upon detection of a user's first gesture, e.g., a drag 830 to the lower-end bezel region on the second region 820 in FIG. 8B, the controller executes the music application as shown in FIG. 8C.

Figure 8D:
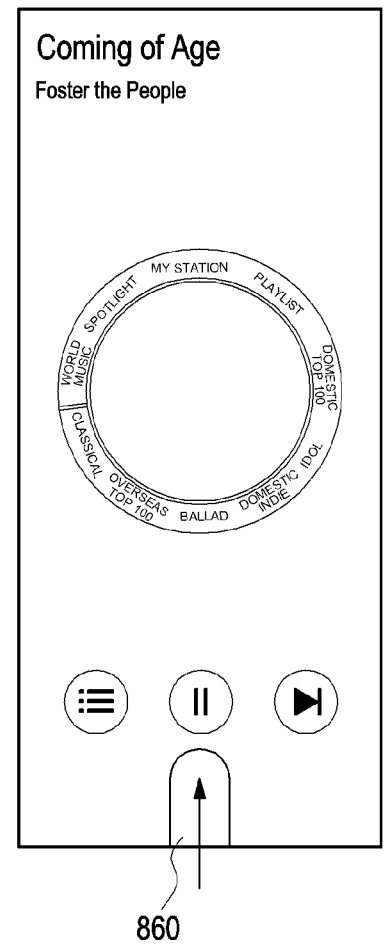
Figure 8E:
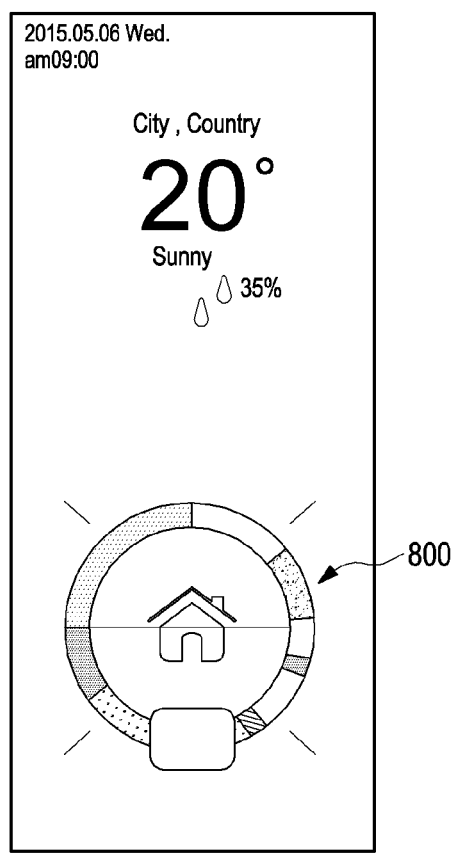

Upon detection of a user's second gesture, e.g., a drag 860 to an upper end from the lower-end bezel region during execution of the music application as shown in FIG. 8D, the controller terminates the music application and switches to the home screen including the UI 800 as shown in FIG. 8E.

According to various embodiments, when at least one object arranged on the UI includes a first object having information unidentified by the user during display of the UI on the home screen, the controller 410 displays an indication indicating existence of the unidentified information in the first object.

According to an embodiment, while displaying the UI, the controller 410 displays an indication (e.g., an icon) indicating existence of the unidentified information around a block corresponding to the first object.

According to an embodiment, upon selection of the indication displayed around the block corresponding to the first object, the controller 410 displays details of the unidentified information as a preview screen.

According to an embodiment, upon selection of the indication displayed around the block corresponding to the first object, the controller 410 stores the details of the unidentified information as the last screen information of the first object and the block corresponding to the first object is located at the first position indicating the present time.

According to an embodiment, upon detecting the first gesture, e.g., a drag to the lower-end bezel region on the second region of the UI while displaying the details as the preview screen, the controller 410 executes the first object.

According to an embodiment, upon detecting the second gesture, e.g., a drag to an upper end from the lower-end bezel region while executing the first object, the controller 410 terminates execution of the first object and displays the home screen providing the UI.

With reference to FIG. 9, a description will be made of an operation of indicating unidentified information through a UI provided on a home screen.

FIGS. 9A through 9D are views for describing an operation of providing unidentified information through a UI in an electronic device according to various embodiments. In FIGS. 9A through 9D, at least one application arranged on the UI is described as an example.

Figure 9A:
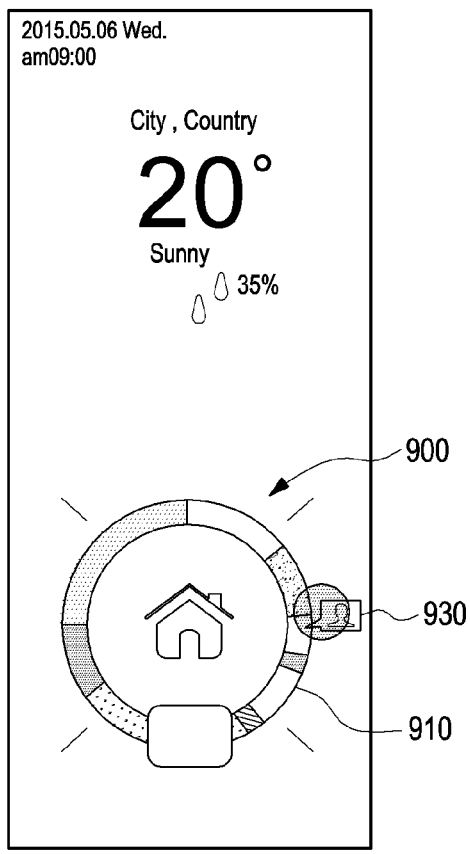
FIGS. 9A through 9D are views for describing an operation of providing unidentified information through a UI in an electronic device according to various embodiments.

As shown in FIG. 9A, a controller (410 of FIG. 4) displays an icon 930 indicating existence of unidentified information around a block corresponding to an SNS application including the unidentified information among applications arranged on a first region 910 of a UI 900 provided on the home screen.

Figure 9B:
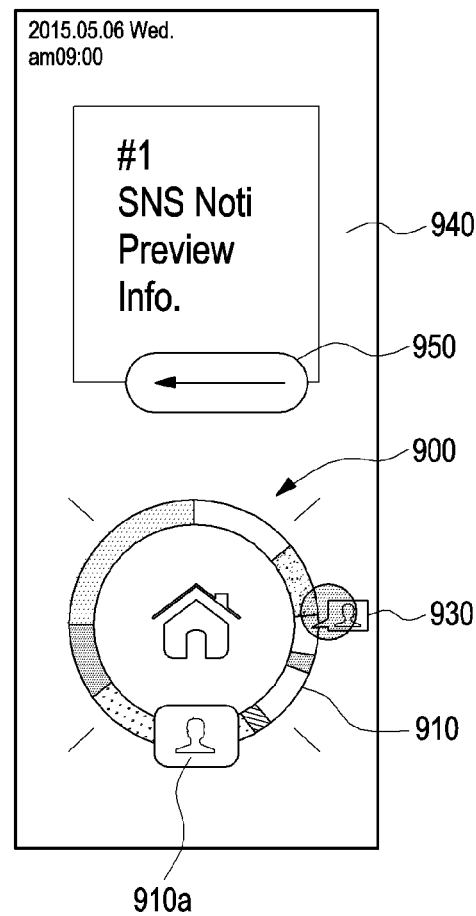

In FIG. 9A, upon selection of the icon 930, the controller displays the details of the unidentified information as a preview screen, locates a block corresponding to the SNS application at the first position indicating the present time, and displays an icon indicating a type of the SNS application on the pointer located at the first position, as shown in FIG. 9B. The controller provides a function related to the SNS application, e.g., a flick function, while displaying the details of the unidentified information as the preview screen.

Figures 9C, 9D:
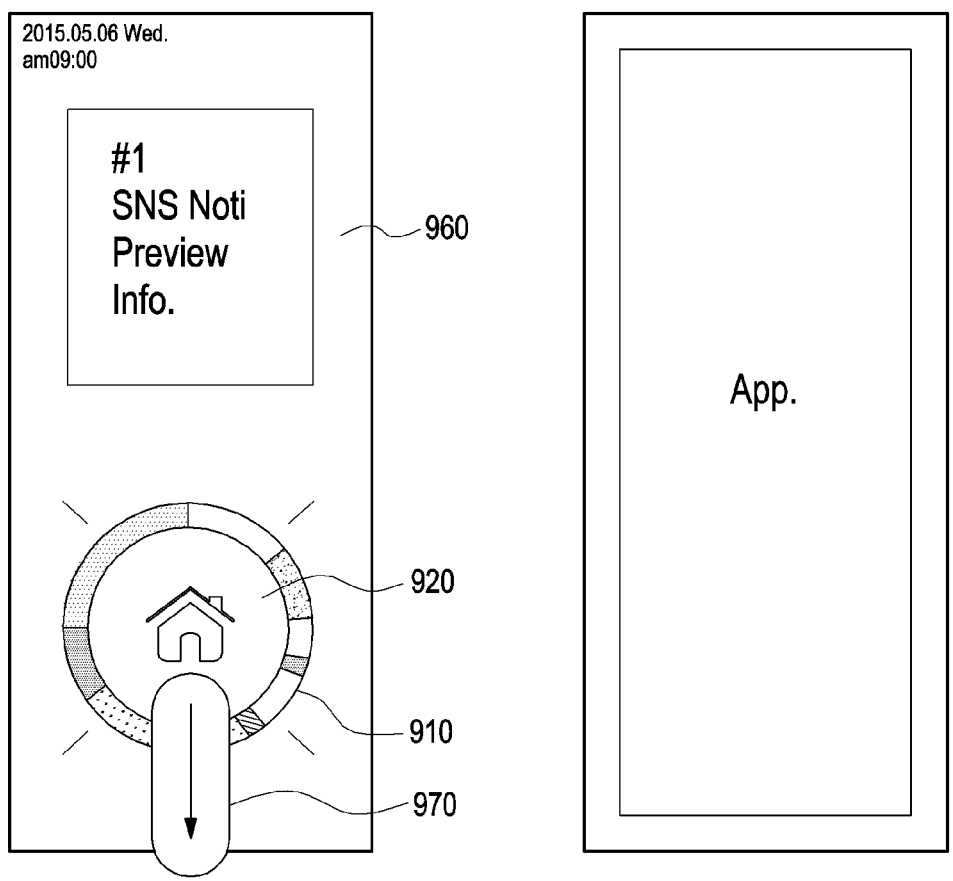

Once the flick function 950 is executed by a user in FIG. 9B, the controller displays other details as a preview screen 960 as shown in FIG. 9C.

Upon detection of a user's first gesture, e.g., a drag 970 to the lower-end bezel region on the second region in FIG. 9C, the controller executes the SNS application as shown in FIG. 9D.

According to various embodiments, the controller 410 displays a UI on which at least one objects are arranged in time order on a lock screen and displays information about an object that is selected by a user from among the at least one object arranged on the UI while displaying the UI, through a preview screen on the display 420.

According to an embodiment, the controller 410 displays the pointer movable on the first region of the UI provided on the lock screen at the first position indicating the present time by default and displays information about an object corresponding to a past block or a future block on a preview screen in a direction in which the pointer moves from the first position on the second region of the UI.

The controller 410 displays information about an object corresponding to a past block in which the pointer is located as the preview screen on the second region, when the pointer moves from the first position of the first region in the first direction. When the pointer repeats moving on the first region in the first direction, the controller 410 updates and displays the past block corresponding to the executed object in time order on the first region.

When the pointer moves from the first position in the second direction, the controller 410 displays information about an object corresponding to a future block in which the pointer is located as the preview screen on the second region. When the pointer repeats moving on the first region in the second direction, the controller 410 updates and displays the future block corresponding to the executed object in time order on the first region.

When the pointer moves on the first region, the controller 410 displays an indication (e.g., an icon) indicating a type of an object corresponding to a block in which the pointer is located on a partial region of the pointer.

The controller 410 displays blocks displayed on the first region differently (e.g., in different colors) depending on a type or category of an object.

According to an embodiment, upon detecting a first gesture when displaying the information about the object selected on the UI as the preview screen on the second region, the controller 410 executes the selected object. Upon detecting the first gesture, e.g., a drag to a lower-end bezel region on the second region when displaying the information about the object corresponding to the block where the pointer is located on the first region of the UI on the second region, the controller 410 releases locking and executes the object corresponding to the block where the pointer is located.

According to an embodiment, upon detecting a second gesture, e.g., a drag to an upper end from the lower-end bezel region when executing the object through the first gesture, the controller 410 terminates execution of the object and switches to the home screen including the UI.

According to an embodiment, upon occurrence of the first gesture when no information about an object is displayed on the second region of the UI, the controller 410 releases locking and switches to the home screen. The controller 410 provides the UI on the home screen to which the controller 410 switches.

With reference to FIG. 10, a description will be made of an operation of controlling an object arranged in time order by using the UI provided on the lock screen.

Figure 10A:
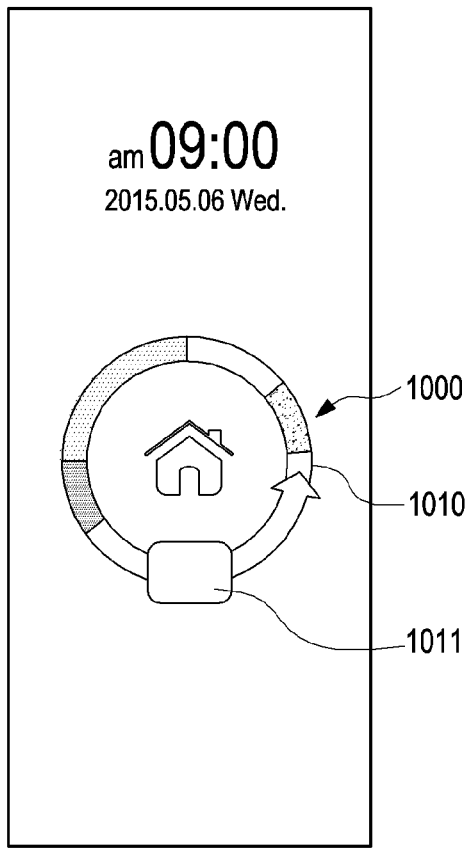
FIGS. 10A through 10C are views for describing a UI provided on a lock screen of an electronic device according to various embodiments.
Figure 10B:
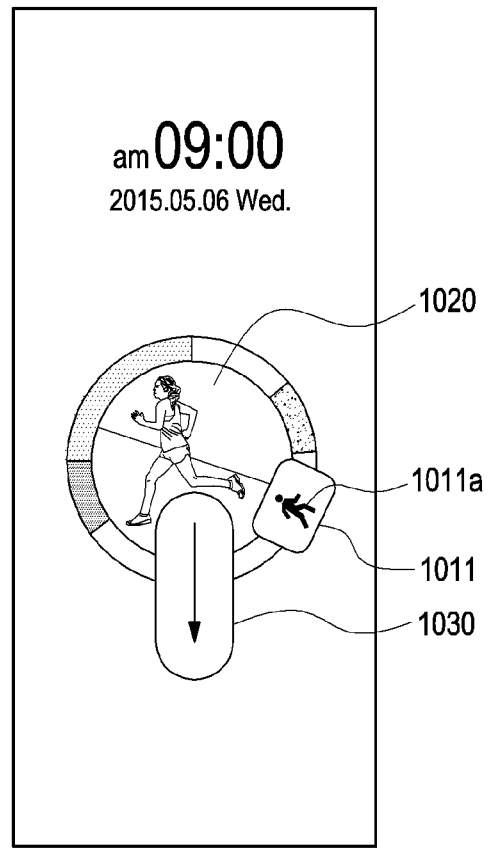
Figure 10C:
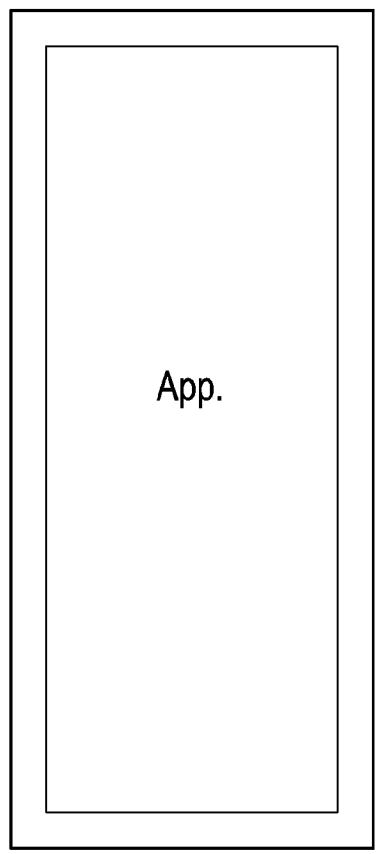

FIGS. 10A through 10C are views for describing a UI provided on a lock screen of an electronic device according to various embodiments. In FIGS. 10A through 10C, at least one application arranged on the UI is described as an example.

Once a pointer 1011 on a first region 1010 is located on a block corresponding to an exercise application by moving in the counterclockwise direction when a UI 1000 is provided on the lock screen as shown in FIG. 10A, a controller (410 of FIG. 4) displays information about the exercise application as a preview screen on a second region 1020 and displays an icon 1011a indicating a type of the exercise application on the pointer 1011 located on the block corresponding to the exercise application as shown in FIG. 10B.

Upon detection of a first gesture, e.g., a drag to the lower-end bezel region on the second region in FIG. 10B, the controller executes the exercise application as shown in FIG. 10C.

According to various embodiments, the display 420 may be, for example, the display 160 shown in FIG. 1. The display 420 displays a UI including at least one object arranged in time order on the home screen or the lock screen.

According to various embodiments, the display 420 may be, for example, the display 160 shown in FIG. 1. The memory 430 stores information about each of at least one object arranged on the UI provided on the home screen or the lock screen.

According to various examples, the display 420 and the controller 410 may display a UI on which at least one object is arranged in time order and may control the display 420 to display information on an object selected from among the at least one object arranged on the UI while displaying the UI.

According to various embodiments, the controller 410 may display the UI on the home screen or the lock screen.

According to various embodiments, the controller 410 displays a pointer movable between the at least one object on the UI and displays information about an object selected by movement of the pointer.

According to various embodiments, the controller 410 divides the UI into a first region and a second region, displays the at least one object on a block basis on the first region, displays the pointer movable between the at least one object, displays an indication for providing a basic menu on the first region on the second region, and displays information about an object corresponding to a block on which the pointer is located based on a moving direction of the pointer.

According to various embodiments, the controller 410 reconfigures the last screen information or particular screen information related to the selected object based on a position of the UI displayed on the display and displays information about the selected object.

According to various embodiments, the controller 410 executes the selected object upon detection of a first gesture while displaying the information about the selected object and terminates execution of the object upon detection of a second gesture while executing the object and displays the UI.

According to various embodiments, when displaying the information about the selected object, the controller 410 provides a function related to the selected object.

According to various embodiments, when there is a first object including information unidentified by a user among the at least one object arranged on the UI, the controller 410 displays an indication indicating existence of the information unidentified by the user around a block corresponding to the first object on the UI.

According to various embodiments, when the indication indicating existence of the unidentified information is selected, the controller 410 displays details of the unidentified information and executes the first object upon detection of a first gesture while displaying the details.

According to various embodiments, the controller 410 displays information about an object selected from among at least one object arranged on a first region of the UI on a second region of the UI, when displaying the UI on a lock screen.

Figure 11:
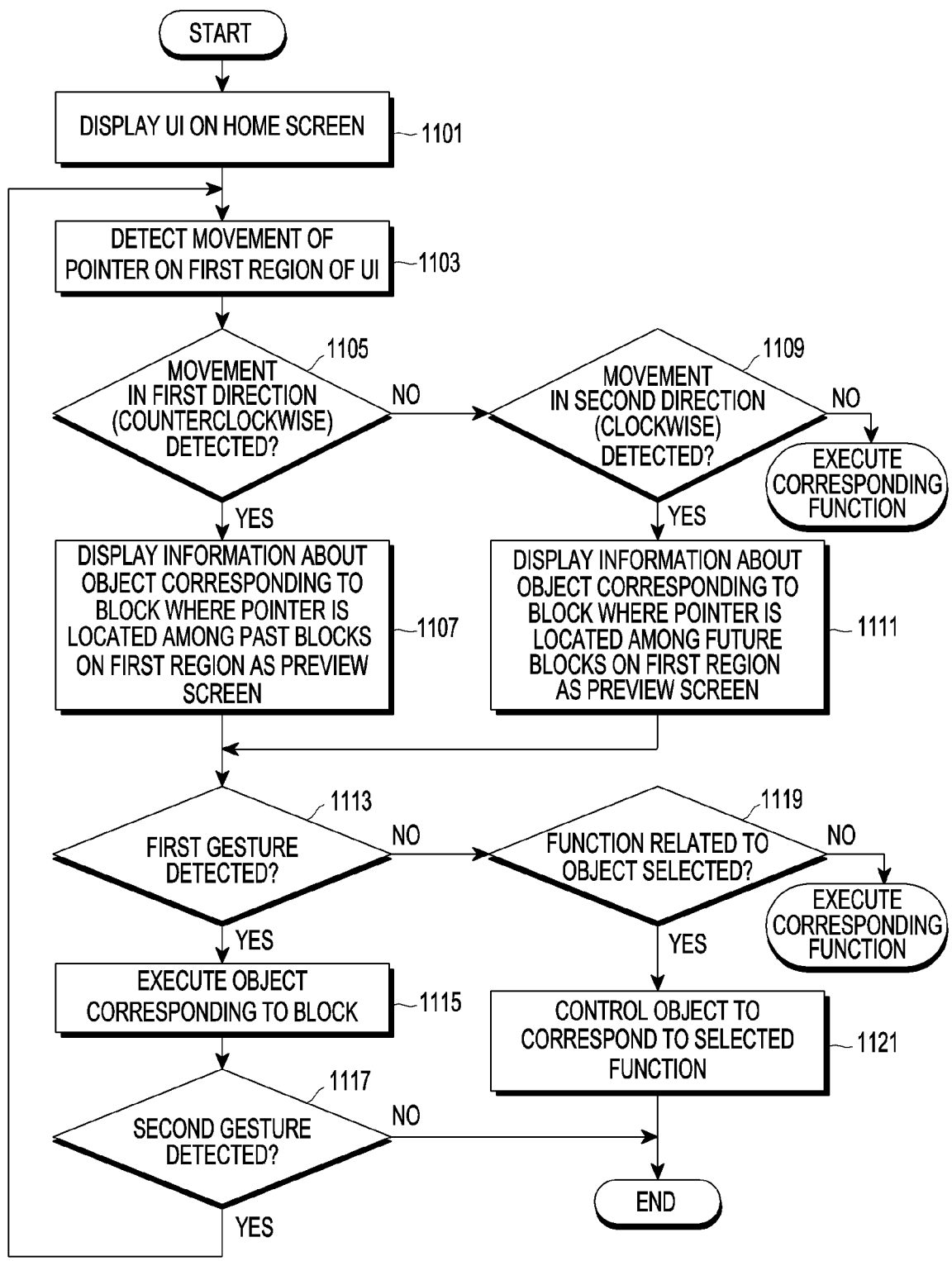
FIG. 11 is a flowchart of a method for controlling an object by using a UI on a home screen of an electronic device according to various embodiments.

FIG. 11 is a flowchart of a method for controlling an object by using a UI on a home screen of an electronic device according to various embodiments. In FIG. 11, the method for controlling an object by using the UI on the home screen of the electronic device according to various embodiments may be described by using an example in which the method is performed by the controller 410 of the electronic device 401 shown in FIG. 4.

Referring to FIG. 11, in operation 1101, the controller displays, on a home screen, a UI on which an object executed in the past and an object to be executed in the future are arranged in time order.

In operation 1103, upon detection of movement of a pointer located at a first position indicating a present time on a first region of the UI, the controller detects a moving direction of the pointer.

When detecting that the pointer moves in a first direction (e.g., the counterclockwise direction) in operation 1105, the controller displays information about an object corresponding to a block where the pointer is located among past blocks corresponding to objects executed in the past on the first region as a preview screen on a display (420 of FIG. 4) in operation 1107. In operation 1107, the controller may display the information about the object as a background and the UI on a foreground on the display.

When detecting that the pointer moves in a second direction (e.g., the clockwise direction) in operation 1109, the controller displays information about an object corresponding to a block where the pointer is located among future blocks corresponding to objects to be executed in the future on the first region as a preview screen on the display (420 of FIG. 4) in operation 1111. In operation 1111, the controller may display the information about the object as a background and the UI on a foreground on the display.

Upon detecting a first gesture, e.g., a drag to a lower-end bezel region on a second region in operation 1113 when displaying the information about the object corresponding to the block where the pointer is located as the preview screen in operation 1107 or 1111, the controller executes the object corresponding to the block where the pointer is located in operation 1115.

Upon detecting a second gesture for switching the UI, e.g., a drag to an upper end from the lower-end bezel region in operation 1117 while executing the object corresponding to the block where the pointer is located in operation 1115, the controller terminates execution of the object and goes back to operation 1101 to provide the UI on the home screen.

When displaying the information about the object corresponding to the block where the pointer is located as the preview screen in operation 1107 or operation 1111, the controller may provide a function related to the object. For example, the controller may display soft keys such as a call menu, a message menu, and so forth for the call application, and soft keys such as fast wind, rewind, play, and so forth for the music application. Upon detecting selection of one of functions related to the object in operation 1119, the controller controls the object corresponding to the block where the pointer is located to correspond to the selected function in operation 1121. The functions related to the object have already been described in detail with reference to FIG. 7.

Figure 12:
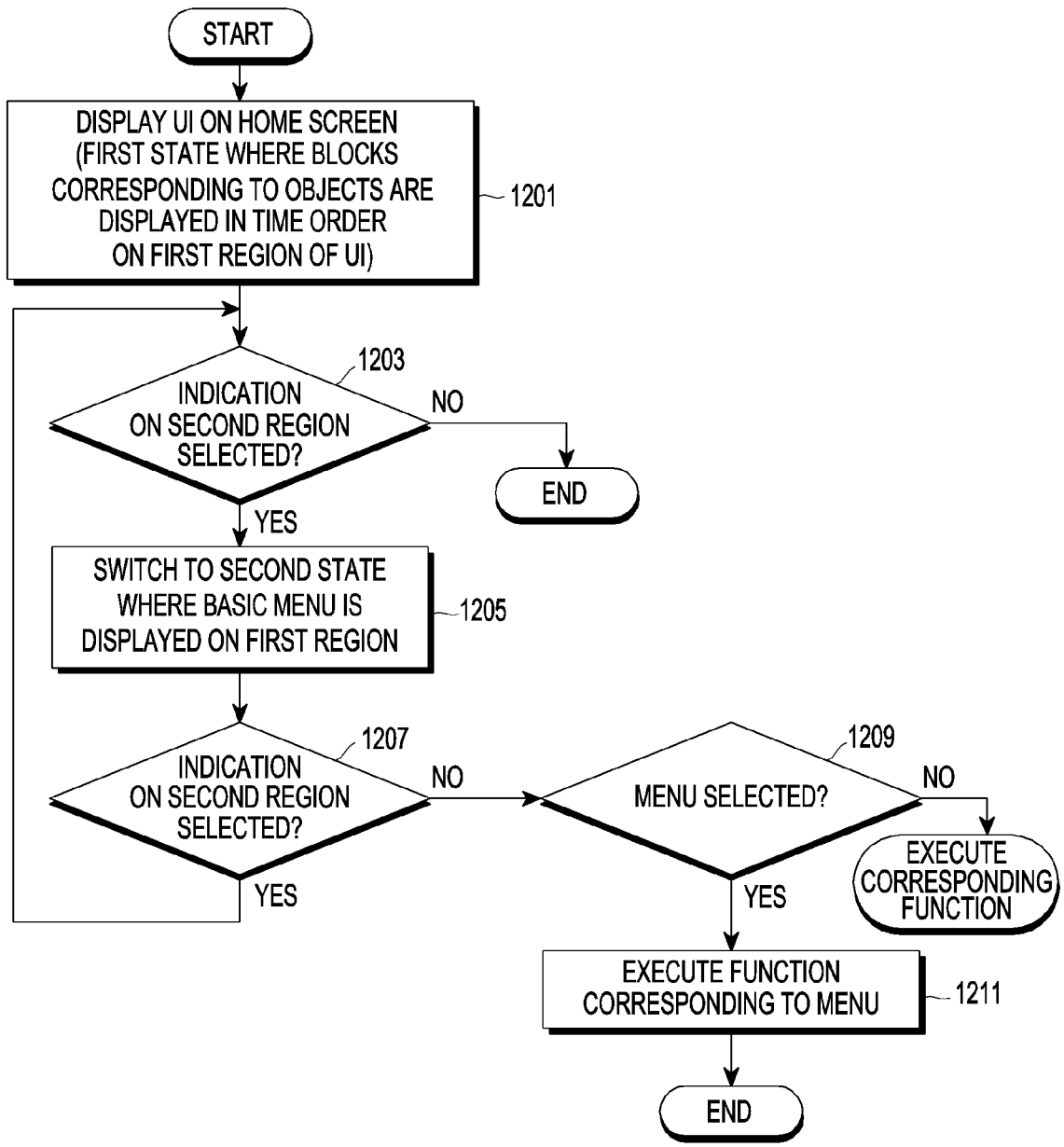
FIG. 12 is a flowchart of a state switch method for a first region of a UI on a home screen of an electronic device according to various embodiments.

FIG. 12 is a flowchart of a state switch method for a first region of a UI on a home screen of an electronic device according to various embodiments. In FIG. 12, the state switch method for the first region on the UI on the home screen of the electronic device according to various embodiments may be described by using an example in which the state switch method is performed by the controller 410 of the electronic device 401 shown in FIG. 4.

Referring to FIG. 12, in operation 1201, the controller displays, on a home screen, a UI on which an object executed in the past and an object to be executed in the future are arranged in time order. In operation 1201, a first region of the UI may be in a first state where blocks corresponding to at least one object are arranged and displayed in time order.

Upon detecting selection of an indication displayed on a second region of the UI in the first state where the blocks corresponding to the at least one object are arranged and displayed in time order in operation 1203, the controller switches to a second state where a basic menu is displayed on the first region in operation 1205. In operation 1205, the controller may divide the first region into as many sub regions as preset basic menus and display an icon indicating the basic menu on each of the sub regions.

Upon detecting selection of the indication displayed on the second region of the UI in the second state where the basic menu is displayed on the first region in operation 1207, the controller switches to the first state where the blocks corresponding to the at least one object are arranged and displayed in time order and performs operation 1203.

Upon detecting selection of a predetermined menu in the second state where the basic menu is displayed on the first region in operation 1209, the controller executes a function corresponding to the selected menu in operation 1211.

Figure 13:
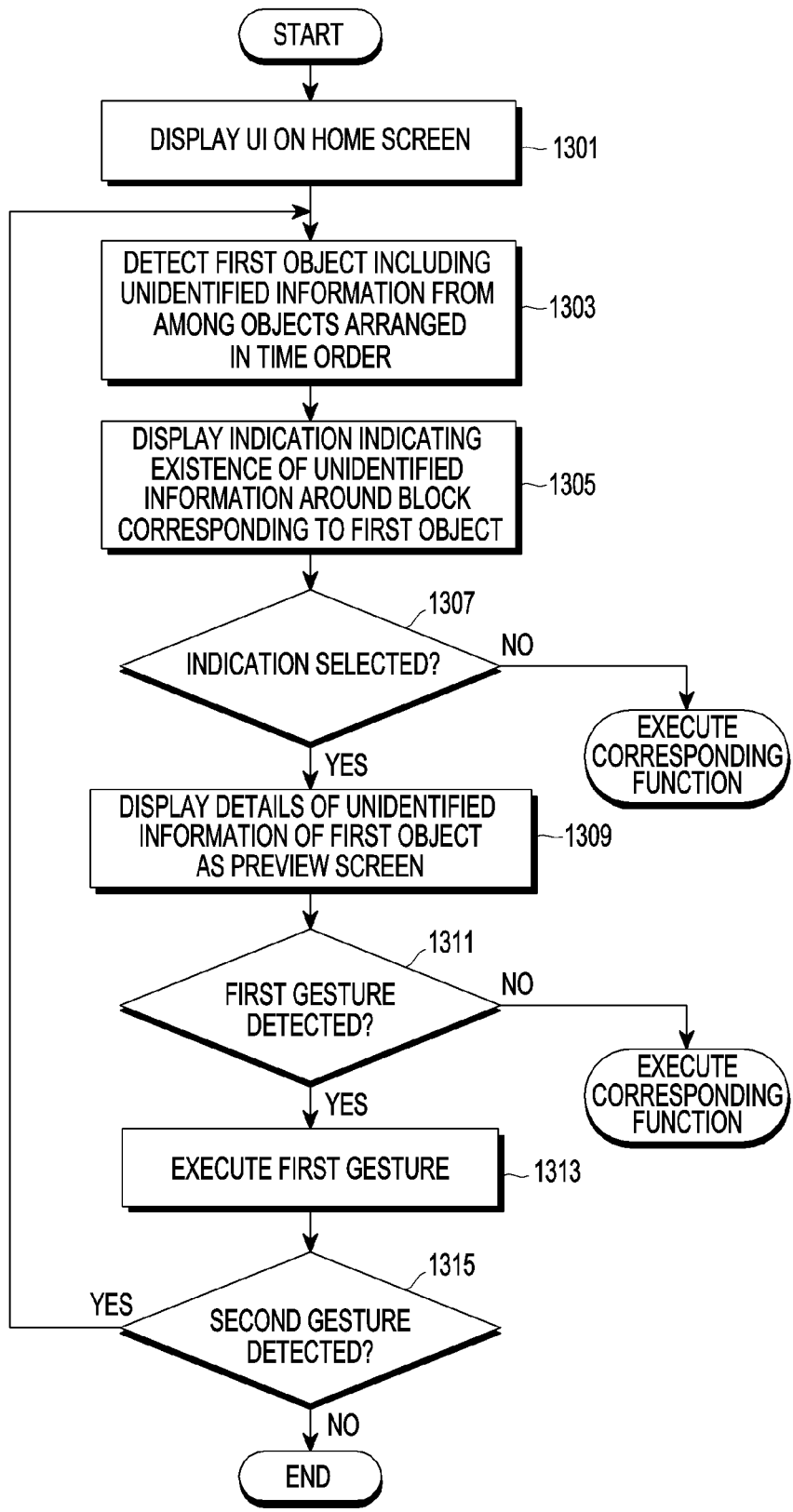
FIG. 13 is a flowchart of a method for controlling unidentified information by using a UI on a home screen of an electronic device according to various embodiments.

FIG. 13 is a flowchart of a method for controlling unidentified information by using a UI on a home screen of an electronic device according to various embodiments. In FIG. 13, the method for controlling unidentified information by using the UI on the home screen of the electronic device according to various embodiments may be described by using an example in which the method is performed by the controller 410 of the electronic device 401 shown in FIG. 4.

In operation 1301, the controller displays, on a home screen, a UI on which an object executed in the past and an object to be executed in the future are arranged in time order.

In operation 1303, the controller detects a first object including unidentified information from among the at least one object arranged in time order on a first region of the UI.

In operation 1308, the controller displays an indication indicating existence of the unidentified information around a block corresponding to the first object.

Upon detecting selection of the indication in operation 1307, the controller displays details of the unidentified information as a preview screen in operation 1309. In operation 1309, the controller may detect selection of the indication, locate a block corresponding to the first object at a first position indicating a present time on the first region while displaying the details of the unidentified information as the preview screen, and display an icon indicating a type of the first object on a pointer located at the first position.

Upon detecting a first gesture for executing an object, e.g., a drag to a lower-end bezel region on a second region in operation 1113 when displaying the details of the unidentified information as the preview screen, the controller executes the first object in operation 1313.

Upon detecting a second gesture, e.g., a drag to an upper end from the lower-end bezel region while executing the first object in operation 1315, the controller 410 terminates execution of the first object and goes back to operation 1301 to display the UI on the home screen.

Figure 14:
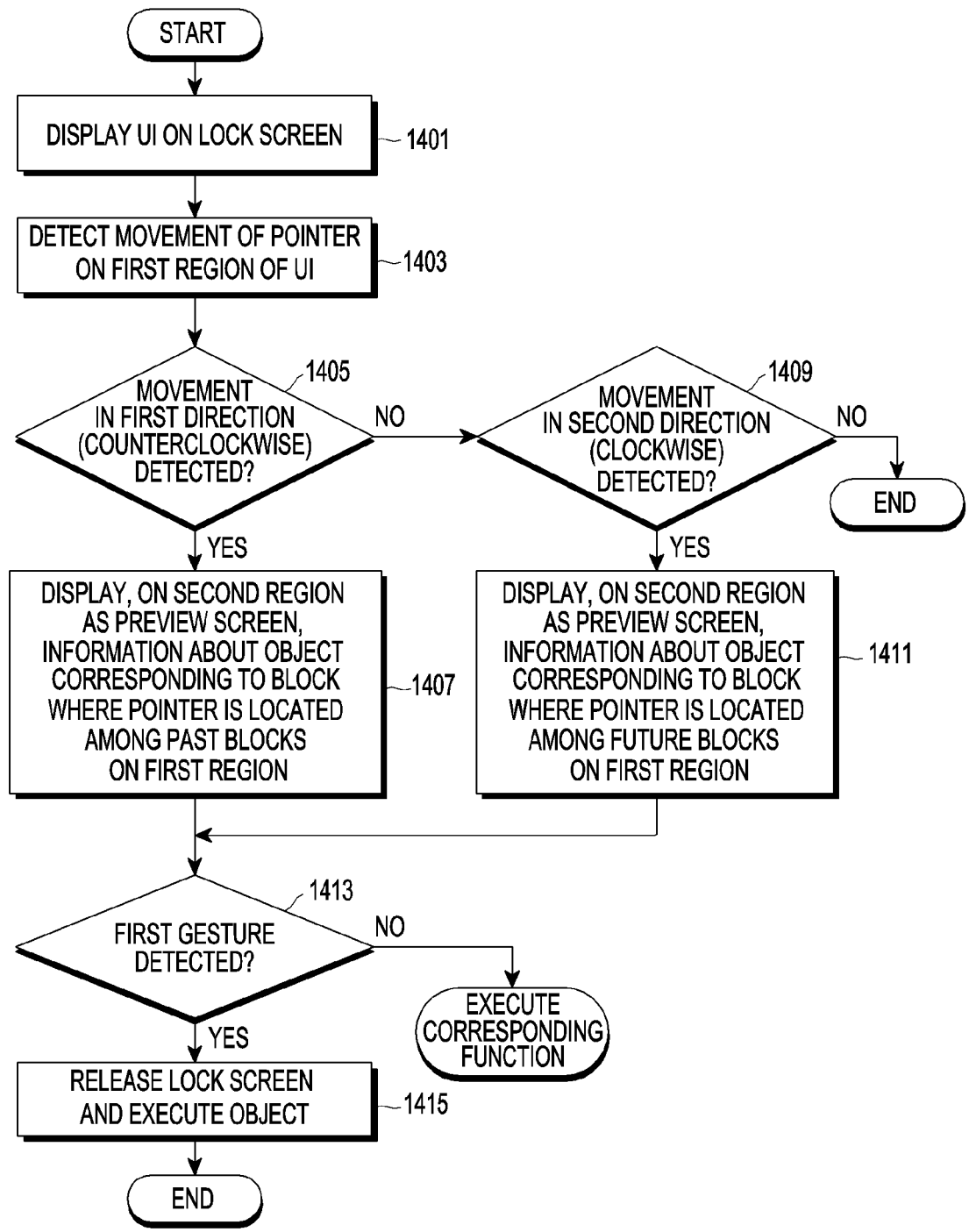
FIG. 14 is a flowchart of a method for controlling an object by using a UI on a lock screen of an electronic device according to various embodiments.

FIG. 14 is a flowchart of a method for controlling an object by using a UI on a lock screen of an electronic device according to various embodiments. In FIG. 14, the method for controlling an object by using the UI on the lock screen of the electronic device according to various embodiments may be described by using an example in which the method is performed by the controller 410 of the electronic device 401 shown in FIG. 4.

Referring to FIG. 14, in operation 1401, the controller displays, on a lock screen, a UI on which an object executed in the past and an object to be executed in the future are arranged in time order.

In operation 1403, the controller detects a moving direction of a current pointer on a first region of the UI.

When detecting that the pointer moves in a first direction (e.g., the counterclockwise direction) in operation 1405, the controller displays information about an object corresponding to a block where the pointer is located among past blocks corresponding to objects executed in the past on the first region as a preview screen on a second region of the UI in operation 1407.

When detecting that the pointer moves in a second direction (e.g., the clockwise direction) in operation 1409, the controller displays information about an object corresponding to a block where the pointer is located among future blocks corresponding to objects to be executed in the future on the first region as a preview screen on the second region of the UI in operation 1411. Upon detecting a first gesture, e.g., a drag to a lower-end bezel region on the second region in operation 1413 when displaying the information about the object corresponding to the block where the pointer is located as the preview screen in operation 1407 or 1411, the controller releases locking of the electronic device and executes the object corresponding to the block where the pointer is located in operation 1415.

Figure 15:
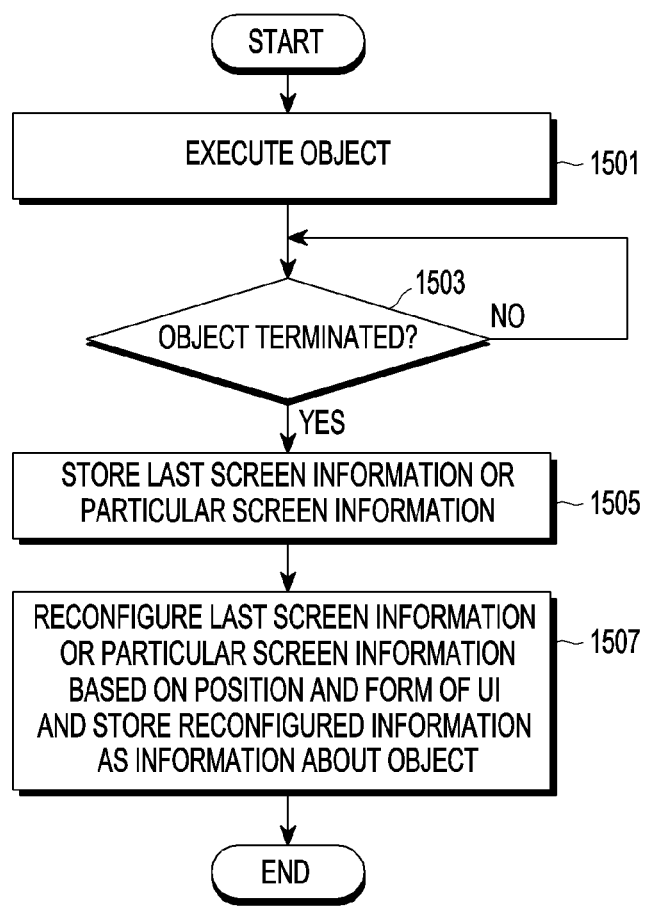
FIG. 15 is a flowchart of a method for configuring a preview screen in an electronic device according to various embodiments.

FIG. 15 is a flowchart of a method for configuring a preview screen in an electronic device according to various embodiments. In FIG. 15, the method for configuring the preview screen in the electronic device according to various embodiments may be described by using an example in which the method is performed by the controller 410 of the electronic device 401 shown in FIG. 4.

In operation 1501, the controller executes an object selected by the user. Upon detecting termination of execution of the object in operation 1503, the controller stores the last screen information or particular screen information of the object in operation 1505. The particular screen information may include screen information selectable by the user at the time of termination of execution of the object.

In operation 1507, the controller reconfigures the last screen information or the particular screen information based on a position and a form of the UI and stores the reconfigured information as information about the object.

In operation 1507, the controller may reconfigure the last screen information or the particular screen information such that main information of the last screen information or the particular screen information is not hidden on the UI displayed on the home screen and store the reconfigured information as information about the object to be displayed as the preview screen. The controller may reconfigure the last screen information or the particular screen information such that the main information of the last screen information or the particular screen information is displayed on the second region of the UI and store the reconfigured information as information about the object to be displayed as the preview screen.

The controller may perform operation 1507 when displaying information about an object corresponding to a block selected by movement of the pointer as a preview screen on the first screen of the UI on the home screen or the lock screen and may display the information about the object corresponding to the block selected by movement of the pointer as the preview screen.

According to various embodiments, a method for controlling a UI of an electronic device includes displaying the UI on which at least one object is arranged in time order and displaying information about an object selected from among the at least one object arranged on the UI, while displaying the UI.

According to various embodiments, the UI may display the UI on the home screen or the lock screen.

According to various embodiments, the method may further include displaying a pointer movable between the at least one object on the UI and displaying information about an object selected from among the at least one object by movement of the pointer.

According to various embodiments, the displaying of the information about the object may further include dividing the UI into a first region and a second region, displaying the at least one object on a block basis on the first region, displaying the pointer movable between the at least one object, and displaying, on the second region, an indication for providing a basic menu on the first region, and displaying information about an object corresponding to a block where the pointer is located, based on a moving direction of the pointer, when the pointer moves on the first region.

According to various embodiments, the displaying of the preview screen may include reconfiguring last screen information or particular screen information related to the selected object based on a position of the UI displayed on the display and displaying information about the selected object.

According to various embodiments, the method may further include executing the selected object, upon detecting a first gesture while displaying the information about the selected object and terminating the execution of the object and displaying the UI, upon detecting a second gesture while executing the object.

According to various embodiments, the method may further include providing a function related to the selected object while displaying the information about the selected object.

According to various embodiments, the method may further include displaying an indication indicating existence of information unidentified by a user around a block corresponding to a first object on the UI, when there exists the first object including the unidentified information among the at least one object arranged on the UI.

According to various embodiments, the method may further include displaying details of the unidentified information when the indication indicating the existence of the unidentified information is selected, and executing the first object, upon detecting a first gesture while displaying the details.

According to various embodiments, the method may further include displaying information about an object selected from among at least one object arranged on a first region of the UI on a second region of the UI, when displaying the UI on a lock screen.

According to various embodiments, a storage medium has recorded thereon instructions that cause, when executed by at least one processor, to the at least one processor to perform at least one operation that includes displaying a UI on which at least one object is arranged in time order and displaying information about an object selected from among the at least one object arranged on the UI, while displaying the UI.

The invention claimed is:

1. An electronic device comprising:
 a display; and
 a controller configured to control the display to:
  display a user interface (UI) including a first region and a second region, the first region comprising a plurality of objects in time order and the second region comprising an indication;
  based on an object selected among the plurality of objects displayed in time order in the first region, display information about the selected object at a location corresponding to the selected object; and
  based on the indication displayed in the second region selected while the plurality of objects is displayed in time order in the first region, display preset basic menus in place of the plurality of objects in the first region,
  wherein the plurality of objects in time order comprises at least one past object arranged in a first direction and at least one future object arranged in a second direction opposite to the first direction based on a first position representing a present time, the at least one past object corresponding to a previous user activity and the at least one future object corresponding to a future user activity.

2. The electronic device of claim 1, wherein the controller is further configured to display a pointer movable between at least one object on the UI and to display the information about the object selected by movement of the pointer.

3. The electronic device of claim 2, wherein the controller is further configured to:
 divide the UI into the first region and the second region;
 display the at least one object on a block basis on the first region and display the pointer movable between the at least one object;
 display, on the second region, the indication for providing a basic menu on the first region; and
 display information about an object corresponding to a block where the pointer is located, based on a moving direction of the pointer, when the pointer moves on the first region.

4. The electronic device of claim 1, wherein the controller is further configured to reconfigure last screen information or particular screen information related to the selected object based on a position of the UI displayed on the display and display the information about the selected object.

5. The electronic device of claim 1, wherein the controller is further configured to:
 execute the selected object, upon detecting a first gesture while displaying the information about the selected object; and
 terminate the execution of the object and displaying the UI, upon detecting a second gesture while executing the object.

6. The electronic device of claim 1, wherein the controller is further configured to provide a function related to the selected object while displaying the information about the selected object.

7. The electronic device of claim 1, wherein the controller is further configured to:
 display an indication indicating existence of information unidentified by a user around a block corresponding to a first object on the UI, when there exists the first object comprising the unidentified information among the plurality of objects arranged on the UI; and
 display details of the unidentified information when the indication indicating existence of the unidentified information is selected and execute the first object upon detection of a first gesture while displaying the details.

8. The electronic device of claim 1, wherein the controller is further configured to display information about an object selected from among at least one object arranged on the first region of the UI on the second region of the UI, when displaying the UI on a lock screen.

9. A method for controlling a user interface (UI) of an electronic device, the method comprising:

displaying the UI including a first region and a second region, the first region comprising a plurality of objects in time order and the second region comprising an indication;

based on an object selected among the plurality of objects displayed in time order in the first region, displaying information about the selected object at a location corresponding to the selected object; and based on the indication displayed in the second region selected while the plurality of objects is displayed in time order in the first region, displaying preset basic menus in place of the plurality of objects in the first region, wherein the plurality of objects in time order comprises at least one past object arranged in a first direction and at least one future object arranged in a second direction opposite to the first direction based on a first position representing a present time, the at least one past object corresponding to a previous user activity and the at least one future object corresponding to a future user activity.

10. The method of claim 9, further comprising displaying a pointer movable between the plurality of objects on the UI and displaying the information about the object selected from among the plurality of objects by movement of the pointer, wherein the displaying of the information about the selected object comprises:

dividing the UI into the first region and the second region;

displaying the plurality of objects on a block basis on the first region, displaying the pointer movable between the plurality of objects, and displaying, on the second region, the indication for providing a basic menu on the first region; and displaying information about an object corresponding to a block where the pointer is located, based on a moving direction of the pointer, when the pointer moves on the first region.

11. The method of claim 9, further comprising reconfiguring last screen information or particular screen information related to the selected object based on a position of the UI displayed on a display and displaying the information about the selected object.

12. The method of claim 9, further comprising:

executing the selected object, upon detecting a first gesture while displaying the information about the selected object; and terminating the execution of the object and displaying the UI, upon detecting a second gesture while executing the object.

13. The method of claim 9, further comprising providing a function related to the selected object while displaying the information about the selected object.

14. The method of claim 9, further comprising:

displaying an indication indicating existence of information unidentified by a user around a block corresponding to a first object on the UI, when there exists the first object comprising the unidentified information among the plurality of objects arranged on the UI;

displaying details of the unidentified information when the indication indicating the existence of the unidentified information is selected; and executing the first object, upon detecting a first gesture while displaying the details.

15. The method of claim 9, further comprising displaying information about an object selected from among at least one object arranged on the first region of the UI on the second region of the UI, when displaying the UI on a lock screen.

* * * * *